(12) United States Patent
Ganapathy (10) Patent No.: US 12,418,833 B2
(45) Date of Patent: Sep. 16, 2025

(54) SYSTEM FOR STEERING CLIENT DEVICES WITH NON-WEAK LINK IN COMMUNICATION NETWORK AND METHOD THEREOF

(71) Applicant: Qubercomm Technologies, Inc., Walnut, CA (US)

(72) Inventor: Srinivasan Ganapathy, Chennai (IN)

(73) Assignee: Qubercomm Technologies, Inc., Walnut, CA (US)

( * ) Notice: Subject to any disclaimer, the term of this patent is extended or adjusted under 35 U.S.C. 154(b) by 155 days.

(21) Appl. No.: 16/871,931

(22) Filed: May 11, 2020

(65) Prior Publication Data

US 2020/0383001 A1    Dec. 3, 2020

(30) Foreign Application Priority Data

May 11, 2019    (IN) .............................. 201921014728

(51) Int. Cl.

| | |
|---|---|
| *H04W 28/08* | (2023.01) |
| *H04B 17/318* | (2015.01) |
| *H04L 41/0668* | (2022.01) |
| *H04W 24/08* | (2009.01) |
| *H04W 84/18* | (2009.01) |
| *H04W 88/16* | (2009.01) |

(52) U.S. Cl.
CPC ...... *H04W 28/0958* (2020.05); *H04B 17/318* (2015.01); *H04L 41/0668* (2013.01); *H04W 24/08* (2013.01); *H04W 84/18* (2013.01); *H04W 88/16* (2013.01)

(58) Field of Classification Search
CPC . H04W 28/0958; H04W 24/08; H04W 84/18; H04W 88/16; H04W 28/0236; H04W 24/10; H04W 8/186; H04B 17/318; H04L 41/0668; H04L 41/0816; H04L 43/0888; H04L 43/16; H04L 47/726
See application file for complete search history.

(56) References Cited

U.S. PATENT DOCUMENTS

| | | | |
|---|---|---|---|
| 9,942,800 B2 | 4/2018 | Ho et al. | |
| 2008/0112346 A1 | 5/2008 | Tolpin et al. | |
| 2012/0275320 A1 | 11/2012 | Iyer | |
| 2014/0274044 A1 | 9/2014 | Lee et al. | |
| 2016/0119819 A1* | 4/2016 | Ardeli | H04W 36/22 370/331 |
| 2017/0111854 A1* | 4/2017 | Ho | H04B 7/14 |
| 2017/0208502 A1* | 7/2017 | Ho | H04W 40/22 |

(Continued)

*Primary Examiner* — Peter P Chau
(74) *Attorney, Agent, or Firm* — Buchalter; Jason W. Croft (57) ABSTRACT

The present disclosure relates to a system and method for steeling one or more client devices with a non-weak link in a network. The method comprises identifying, a subset of nodes from a set of nodes in the communication network and each subset of nodes is having a set of client devices connected to the subset of nodes. Data is then received from each client device in the set of client wireless devices associated with each subset of nodes. One or more client devices with a non-weak link are identified in each subset of nodes, with a respective parent node of each of the client device. Each of the client device with the non-weak link are then steered based on one or more parameters identified in the data associated with the client device with the non-weak link. The steering is performed towards a root node.

9 Claims, 6 Drawing Sheets

(56) References Cited

U.S. PATENT DOCUMENTS

| | | | | |
|---|---|---|---|---|
| 2017/0230845 A1* | 8/2017 | Pajona | ................ | H04W 16/28 |
| 2018/0213412 A1* | 7/2018 | Makati | ................ | H04W 16/26 |
| 2019/0075469 A1* | 3/2019 | Mahoney | .............. | H04W 16/12 |
| 2021/0385712 A1* | 12/2021 | Acar | .................... | H04W 36/08 |

* cited by examiner

SYSTEM FOR STEERING CLIENT DEVICES WITH NON-WEAK LINK IN COMMUNICATION NETWORK AND METHOD THEREOF

CROSS-REFERENCE TO RELATED PATENT AND PRIORITY

The present application claims priority to Indian Patent Application No 201921014728 filed on May 11, 2019, the entity of which is hereby incorporated by reference.

TECHNICAL FIELD

The present subject matter described herein, in general, relates to a system and a method for steering client device with non-weak link, and more particularly a system and a method for steering client device with non-weak link in a communication network.

BACKGROUND

In a mesh network, client devices are connected to a root node via multiple mesh nodes. Further, a mesh network is a network in which the devices or nodes are connected so that at least some, and sometimes all, have multiple paths to other nodes. This creates multiple routes for information between pairs of users, increasing the resilience of the network in case of a failure of a node or connection. Further, in the mesh network each node can communicate directly with one or more peer nodes and is an ad hoc network that forms mesh of wirelessly interconnected nodes.

The mesh network is used to develop connection between each devices and connection to the cloud-based services such as monitoring environmental conditions, controlling equipment etc. The capacity of wireless mesh networks is affected by many factors such as network architecture, node mobility, node density, traffic pattern, number of channels used. Because the traffic volume in a WMN is expected to be very high, load balancing becomes a crucial part of it. Network load balancing enhances the scalability and availability of network. Load balancing can be used to extend the lifetime of a Mesh Network. Further, the load balancing scheme is required to balance the traffic in the network across the various gateways nodes and avoids overloading any gateway node and smooth performance of the mesh network.

SUMMARY

Before the present system for steering no link client devices in a network and method thereof, are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system for steering non-weak link client devices in a network and method thereof. This summary is not intended to identify essential features of the claimed subject matter nor is it intended for use in determining or limiting the scope of the claimed subject matter.

In one implementation a method for steering one or more client wireless devices, in a communication network is disclosed. The method comprises identifying, a subset of nodes from a set of nodes in the communication network and each subset of nodes is having a set of client wireless devices connected to the subset of nodes. The method further comprises receiving, data from each client device in the set of client wireless devices associated with each subset of nodes and identifying, in each subset of nodes, one or more client devices with a non-weak link with a respective parent node of each of the client device. Further, the method comprises steering, each of the client device with the non-weak link based on one or more parameters identified in the data associated with the client device with the non-weak link.

In another implementation system for steering one or more client wireless devices, in a communication network is disclosed. The system comprises a network balancer. The network balance may be configured to identify a subset of nodes from a set of nodes in the communication network and the subset of nodes may be identified based on the data. The network balancer may further identify, in each subset of nodes, one or more client device with a non-weak link with a respective parent node of each of the client device and steer, the one or more client devices with a non-weak link based on one or more parameters identified in the data associated with the one or more client devices with a non-weak link.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific system for steering non-weak link client devices in a network and method thereof disclosed in the document and the figures.

The present subject matter is described in detail with reference to the accompanying. In the figures, the left-most digit(s) of a reference number identifies the figure in which the reference number appears. The number are throughout the drawings to refer various features of the present invention.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. system for steering non-weak link client devices in a network and method thereof similar or equivalent to those described herein can be used in the practice or testing of embodiments of the present disclosure, the exemplary, system and methods are now described. The disclosed embodiments system for steering non-weak link client devices in a network and method thereof are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for steering client devices with non-weak link in the network is not intended to be limited to the embodiments described, but is to be accorded the widest scope consistent with the principles and features described herein.

In one implementation nodes may correspond to an access point boxes, client means a wireless station, weak link client device means a device having a weak wireless association with an access-point with respect to signal strength.

In one implementation steering may corresponding to moving the client device from one node to other.

Figure 1:
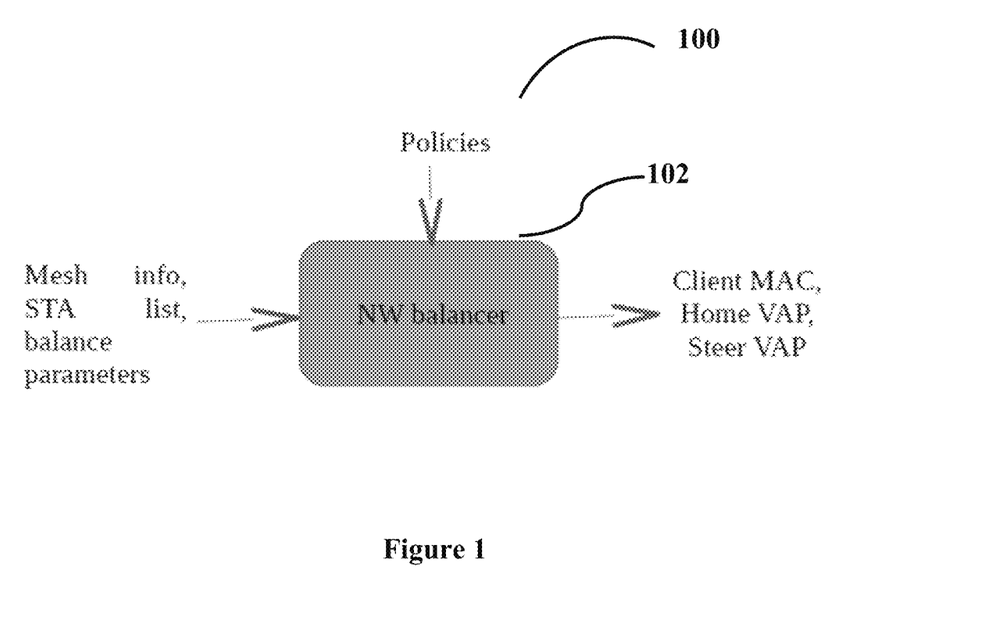
FIG. 1 illustrates an overview of system with a network balancing, in accordance with an embodiment of the present subject matter.

Now refereeing to FIG. 1, illustrates a system 100 for steering client device in a communication network (may also be referred as network). The system 100 comprises a network balancer 102. The network balancer 102 may be configured to identify a subset of nodes from a set of nodes in the communication network. Further, each subset of nodes may have a set of client devices connected to the subset of nodes. The subset of nodes may be identified based on a comparison of the average traffic at each node with a threshold average traffic. The average traffic at each node from the subset of nodes may be greater than the threshold average traffic. The average traffic may be computed based on an overall network traffic byte and a number of nodes in the mesh network.

In an embodiment the network balancer may be configured to receive a data associated with a set of client devices associated with each subset of nodes, in a communication network. The communication network comprises a mesh network. The mesh network may further comprise a root node, a set of mesh nodes, and the set of client devices connected to the mesh node from a set of mesh node. The client devices may be wireless client devices and may also be referred as node in the mesh network.

In one embodiment, the data associated with a set of client devices in the communication network comprises at least one of a Received Signal Strength Indicator (RSSI) for each client device in the set of client device, a parent node level for each client device, a parent node traffic load for each client device, a parent node traffic load for each client device, an average traffic at each node for each client device, and a throughput value for each client device.

The network balancer 102 may further be configured to identify in each subset of nodes one or more client devices with non-weak link with a respective parent node of each of the client device. The device with non-weak link may be identified based on the comparison of the RSSI each client device with a threshold signal strength. In case the RSSI is greater than the threshold signal strength the client device may be identified as the client device with non-weak link.

Once the client device with non-weak client is identified, the network balancer may steer the client device with non-weak client. The steering may be defined as moving the client device from one node to another node in the communication network.

In an embodiment the steering may be a two step process, selecting the client device with the non-weak link and evaluating a prospective parent based on comparison of one or more parameters.

In one aspect the steering may be performed towards the root. Steering of the client device with the non-weak link towards the root reduces an airtime as number of hops would be less. Further in one aspect the steering may help in balancing a load in the communication network. Further, steering may enhance the scalability and availability of the communication network.

In an embodiment the network balancer 102 is configured to perform steering of the one or more client devices with non-weak link based on the one or more parameters identified in the data associated with the one or more client devices with non-weak link. The parameters identified in the data associated with the one or more client device with non-weak link comprises at least one of a relative RSSI of the client device with network nodes, relative parent node level with other potential parent nodes in the network, relative parent node traffic load with potential parent nodes, relative status of parents radio parameters with other potential parent's parameters, an experience of client wireless devices with parent node and other potential parent nodes, and traffic consumption history of each client device.

In an embodiment the network balancer 102 may be configured to monitor, through the parent node, the RSSI of each of the client device with non-weak link after the client device with non-weak is identified. The parent node may be configured to transmit, results of monitoring, to the root node in the communication network. Further, the root note may identify on a periodic basis stationary client devices from the client devices with the non-weak link and moving client devices from the client devices with the non-weak link based on the monitoring. The moving client devices with non-weak link may be steered by the network balancer 102 in the communication network. Further, the network balancer 102 discards the stationary client devices and the discarding is performed for a predefined time window, as the monitoring is performed on the periodic basis. In one aspect the stationary client device may be discarded in order to improve an average client steering time and efficiency of load balancing in the client device.

In an example embodiment, in the mesh network considered in the proposed system, out of 200 client devices, an average of 20% client devices may be moving client devices. Hence, the mesh network needs to evaluate 40 client devices at every instance. However, identification of the stationary client devices and the moving client wireless devices may improve the steering of the client devices as only moving client devices would be selected for steering. Such a selection of client devices with non-weak link for steering may also save time and may also improve a success percentage of steering performed by the system 100.

In one aspect, the stationary client devices may select a right parent node, or the network may have already selected the right parent for the stationary client devices with the non-weak link and that there might be no further need to steer the stationary clients.

In an embodiment, according to one or more evaluation parameter, the network balance 102 may be configured to select a candidate device for steering form the one or more client devices with non-weak link. The one or more parameters consider for evaluation may be selected for at least one of total traffic at all nodes in the communication network, number of nodes, average node traffic, node traffic, station traffic, number of stations, average station traffic, and a predefined time period from timeout station associated with the node.

The network balancer 102 may select client device with non-weak link as for steering based on checking of one or more conditions. The selection and evaluation of the candidate device is performed by the network balancer 102 according to one or more evaluation parameters. The condition consider may comprise at least one of a condition when node traffic at each node is greater than average node traffic, a condition when at each station node the station traffic is greater than average station traffic the client device is selected as a candidate device for steering, a condition when the client device is a moving client device. The moving client device is identified according to a change in the RSSI sensed by the erect node in a predefined time, the client device is selected as the candidate device for steering.

In an embodiment, the network balancer 102 may be configured to evaluate the candidate device to be selected as the client device with the non-weak link for steering. The evaluating is performed based on a comparison of a throughput estimate for parent node for the client device with a throughput estimate for a prospective parent node for the client device for steering. The client device is selected for the steering in case the throughput estimate for a prospective parent node is greater than the throughput estimate for the parent node. In one aspect the throughput estimate for parent node for the client device and the throughput estimate for the prospective parent node for the client device for steering is calculated by using each of a radio capability of the client device, radio capability of the node, RSSI report, node noise, node load, RSSI index percentage, a desired throughput value to be selected for the comparison.

In one example the throughput calculation will now be discussed. The formula used for calculation of throughput may be represented by Formula. 1

$$\text{Throughput from Node 1 to Node B} = (\text{Physical node capability}) \times (100 - \text{packet error rate}) \%$$ Formula 1

Considering an example to calculate throughput form Node A to Node B the communication network, the physical node capability may be considered as 866M. The packet error Rate (PER) considered here in the example may be 20% from node A to the node B derived from the RSSI value. Then throughput from the node A to the node B may then be calculate as $866*(100-20)\% = 692.8$ Mbps.

Figure 2A:
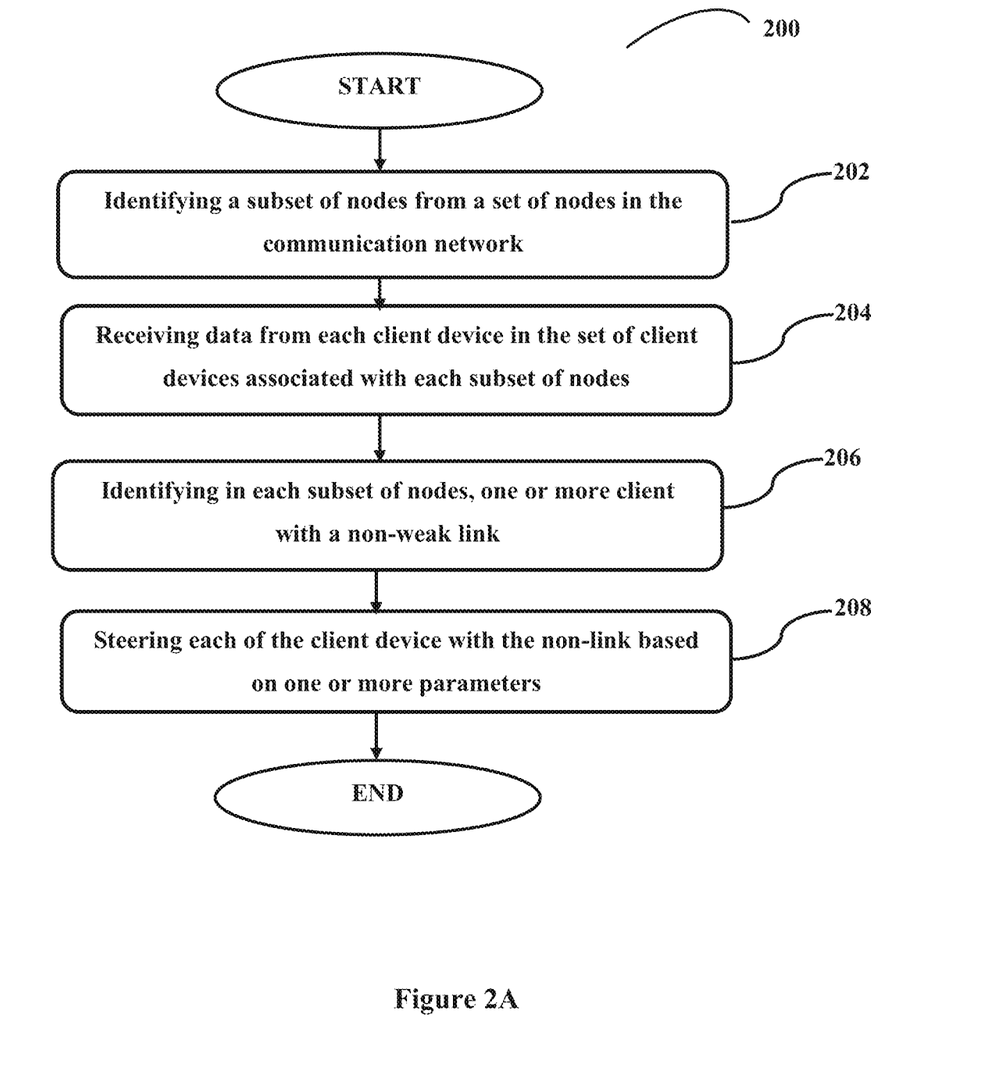
FIG. 2A illustrates a method for steering of a client device in a network with an embodiment of the present subject matter.

In accordance with an exemplary embodiment, referring now to FIG. 2A, a method 200 for steering client devices with the client device with non-weak link in the communication network, is disclosed.

The order in which the method 200 is described is not intended to be construed as a limitation, and any number of the described method blocks can be combined in any order to implement the method or alternate methods. Additionally, individual blocks may be deleted from the method 200 without departing from the spirit and scope of the subject matter described herein. Furthermore, the method 200 may be implemented in a generally known communication network comprising suitable hardware, software, firmware, or combination thereof. However, for ease of explanation, in the embodiments described below, the method 200 may be considered to be implemented in the above described communication network balancer 102.

At block 202, the subset of nodes from the set of nodes in the communication network may be identified. Each subset of nodes may have the set of client devices connected to the subset of nodes.

In one aspect the communication network may comprise the mesh network, and the mesh network may comprise at least one of the root node, the set of mesh nodes, and the set of client wireless devices in set of mesh nodes.

In an embodiment identifying the subset of nodes may be based on comparing the average traffic at each node with the threshold average traffic. The average traffic may be computed based on the overall network traffic and the number of nodes in the communication network.

At block 204, data from each client device in the set of nodes associated with each subset of nodes may be received. In one aspect the data received may comprises Received Signal Strength Indicator (RSSI) for each client device in the set of client wireless devices, parent node hop for each client device, parent node traffic load for each client device, an average traffic at each node for each client device, and a throughput estimate for each client device.

At block 206, one or more client device with non-weak link associated with the subset of nodes may be identified. In one aspect the client device with non-weak link in the network may be identified by comparing the RSSI of each client device with a threshold signal strength. The client device with RSSI greater than the threshold signal strength may be identified as the client device with non-weak link. In an embodiment the client device that may be identified as client device with non-weak link may be steered. In one aspect, the steering comprises moving the client device from one node to another node in the communication network.

In an embodiment the steering may be a two step process, selecting the client device with non-weak link and evaluating a prospective parent based on comparison of one or more parameters.

In one aspect the steering may be performed towards the root. Steering towards the root towards root reduces the airtime as the number of hops would be less. Further in one aspect the steering may help in balancing a load in the communication network. Further, steering may enhance the scalability and availability of the communication network.

At block 208 each of the client with the non-weak link may be steered based on one or more parameters identified in the data associated with the client device with the non-weak link. The parameters identified in the data associated with the client device with the non-weak link may comprise at least one of a relative RSSI of the client device with network nodes, relative parent node level with other potential parent nodes in the communication network, relative parent node traffic load with potential parent nodes, relative status of parent's radio parameters with other potential parent's parameters, an experience of client wireless devices with parent node and other potential parent nodes, and traffic consumption history of each client device.

In an embodiment the method 200 of identifying the client devices with non-weak link further may comprises monitoring, through the parent node, the RSSI of each of the client device with non-weak link after the client device with non-weak link is identified and transmitting, results of monitoring, to a root node in the communication network.

The root node may further identify on a periodic basis, stationary client wireless devices and moving client wireless devices from the client device with non-weak link based on the monitoring. The root node may steer only the moving client wireless devices in the communication network and discard the stationary client wireless devices may be discarded from the steering and the discarding may be performed for a predefined time window. In one aspect the stationary client device may be discarded in order to improve the average client steering time and efficiency of load balancing in the client device.

Figure 2B:
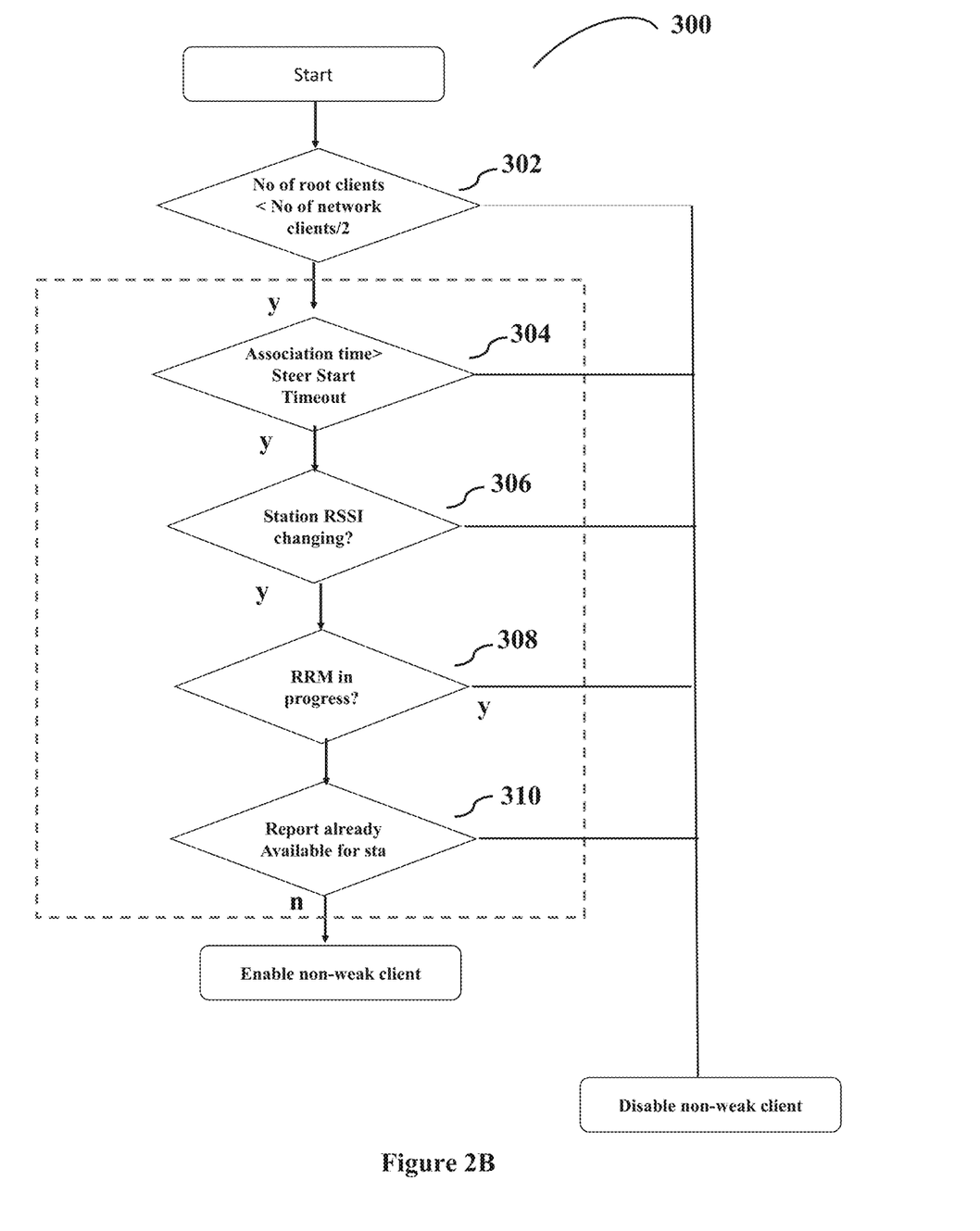
FIG. 2B illustrates a method for selection of weak link client devices, in accordance with an embodiment of the present subject matter.
Figure 2C:
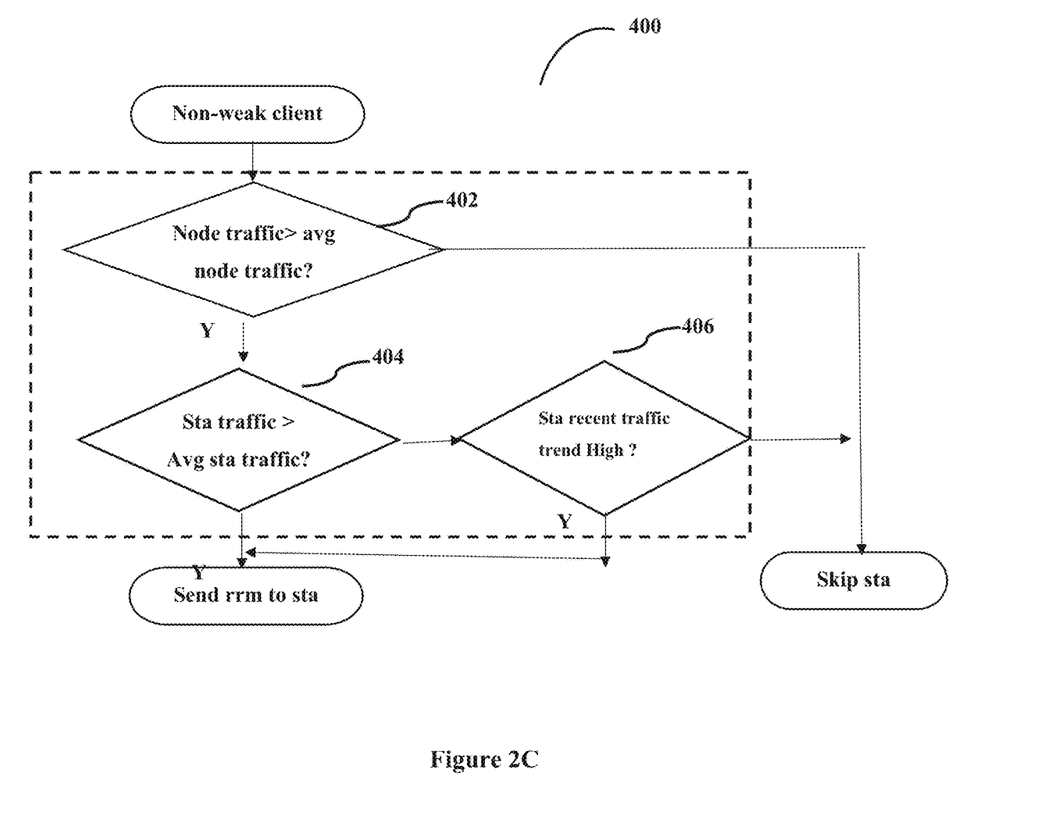
FIG. 2C illustrates a method for identifying client devices with non-weak link, in accordance with an embodiment of the present subject matter.

Now Referring to FIG. 2B and FIG. 2C in combination, the method 200 of identifying client device for steering may further comprise selecting, a candidate device from the one or more client devices with the non-weak link to be steered by the network balancer 102 in the system 100. The selection and evaluation of the candidate device is performed by the network balancer 102 according to one or more evaluation parameters. The evaluation parameters may be considered similar to the one or more parameters identified in the data as discussed earlier. The evaluation parameters may comprise at least one of total traffic at all nodes in the communication network, number of nodes, average node traffic, node traffic, station traffic, number of stations, average station traffic, and a predefined time period from timeout station associated with the node.

The candidate device is selected based on a check of one or more conditions. The one or more conditions comprises at least one of a condition when node traffic at each node is greater than the average node traffic, a condition when at each station node, the station traffic is greater than the average station traffic, and then the client device is selected as the candidate device for steering. The condition also comprises a condition when the client device is the moving client device (as discussed earlier). The moving client device is identified according to the change in the RSSI sensed by the parent node periodically for the predefined time. Based on the monitoring, the client device is then selected as the candidate device for the steering.

As discussed earlier, the selection is performed according to evaluation of the candidate device to be selected as the client device for steering. The evaluation is performed based on a comparison of a throughput estimate for the parent node for the client device, with a throughput estimate for a prospective parent node for the client device to be selected for steering candidate device. The client device is selected for the steering in case the throughput estimate for a prospective parent node is greater than the throughput estimate for the parent node. The throughput estimate for parent node for the client device and the throughput estimate for the prospective parent node for the client device for steering is calculated by using each of a radio capability of the client device, radio capability of the node, RSSI report, node noise, node load, RSSI index percentage, a desired throughput value to be selected for the comparison.

Figure 3:
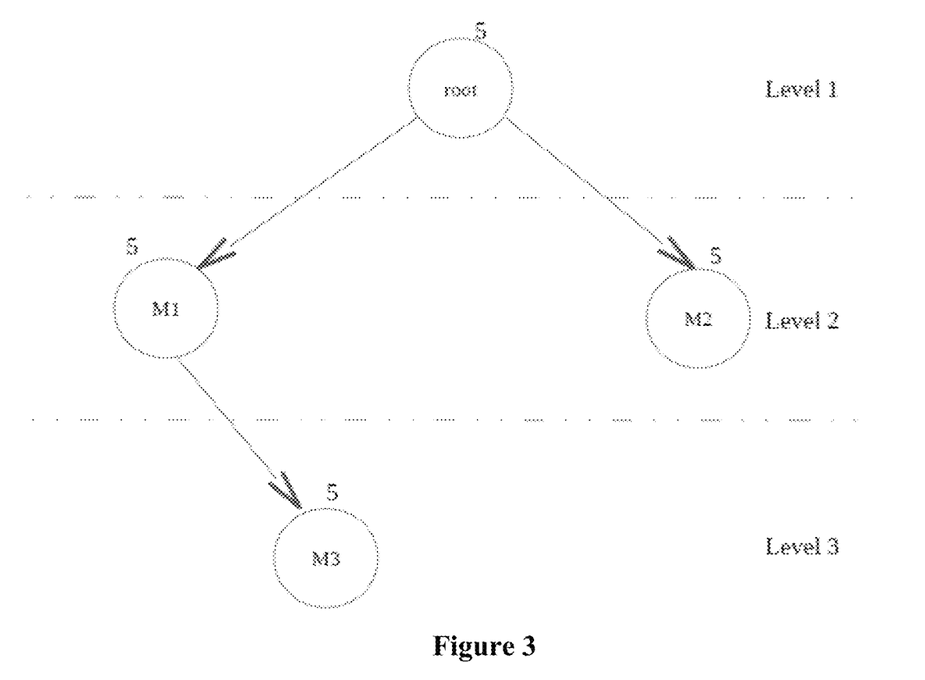
FIG. 3 illustrates an exemplary embodiment of steering the client devices with non-weak link, in accordance with an embodiment of the present subject matter.

Referring now to FIG. 3, an exemplary embodiment for steering the client devices with non-weak link is illustrated in accordance with the present subject matter. The mesh network may comprise level-1, level-2 and level-3. The root node may be located at the level 1. Each of the mesh node M1 and mesh node M2 may be at the level-2 and the mesh node M3 may be at the level-3. In this case, the client device with the non-weak link are steered to one level up for example from level-2 to level 1. Hence, current level and one level up may be evaluated to steer the client device one level up. The nodes only within "vicinity" may be considered.

In one aspect, an actual client device count at each node may be a sum of the set of client devices in the network below the node. Further, a virtual client devices count may be sum of a multiplication of number of clients at each level and a level number, for all the levels below the node. The virtual client count may be computed using equation 1. In this case, if the client device count at any level is less than 50% of the virtual client count at that level, it is time to enable a balancer module.

$$\text{Virtual Client count} = \Sigma(l_n * \Sigma \text{Count}_{ln})_{nl=1} \quad \quad \text{Equation 1}$$

wherein,
l=a level in a network,
n=number of a level, and
count=number of clients at level n.

In one example, consider that all nodes hear all nodes traffic. Further, an actual client counts at the level-1 is 5. The virtual client counts at the level-1 may be computed using equation 2.

$$\text{Virtual client counts at } L1(5*1)+(10*2)+(5*3)=40 \quad \quad \text{Equation 2}$$

Based on equation 2, 5<(50% of 40)→true, enable (M1, M2)→R.

Further, an actual client counts at L2=10. The virtual client count may be computed with equation 3.

$$\text{Virtual client counts at } L2=(10*1)+(5*2)=20 \quad \quad \text{Equation 3}$$

Based on equation 3, 10<(50% 20)→false, disable M3→M2.

In another example, construe that the root node does not hear L3 and below. In this case, an actual client counts at L1=5. The virtual client count may be computed using equation 4.

$$\text{Virtual client counts at } L1(5*1)+(10*2)=25 \quad \quad \text{Equation 4}$$

Based on equation 4, enable M1, M2→R.
Further, the actual client counts at L2=10. Thus, the virtual client count may be computed using equation 5.

$$\text{Virtual client counts at } L2=(10*1)+(5*2)=20 \quad \quad \text{Equation 5}$$

Based on the equation 5, 10<(50% 20)→false, disable M3→M2.

In both the examples mentioned above, steering is evaluated for all the client wireless devices at L2 (to look to move to L1). The client wireless devices at L3 may stay.

Figure 4:
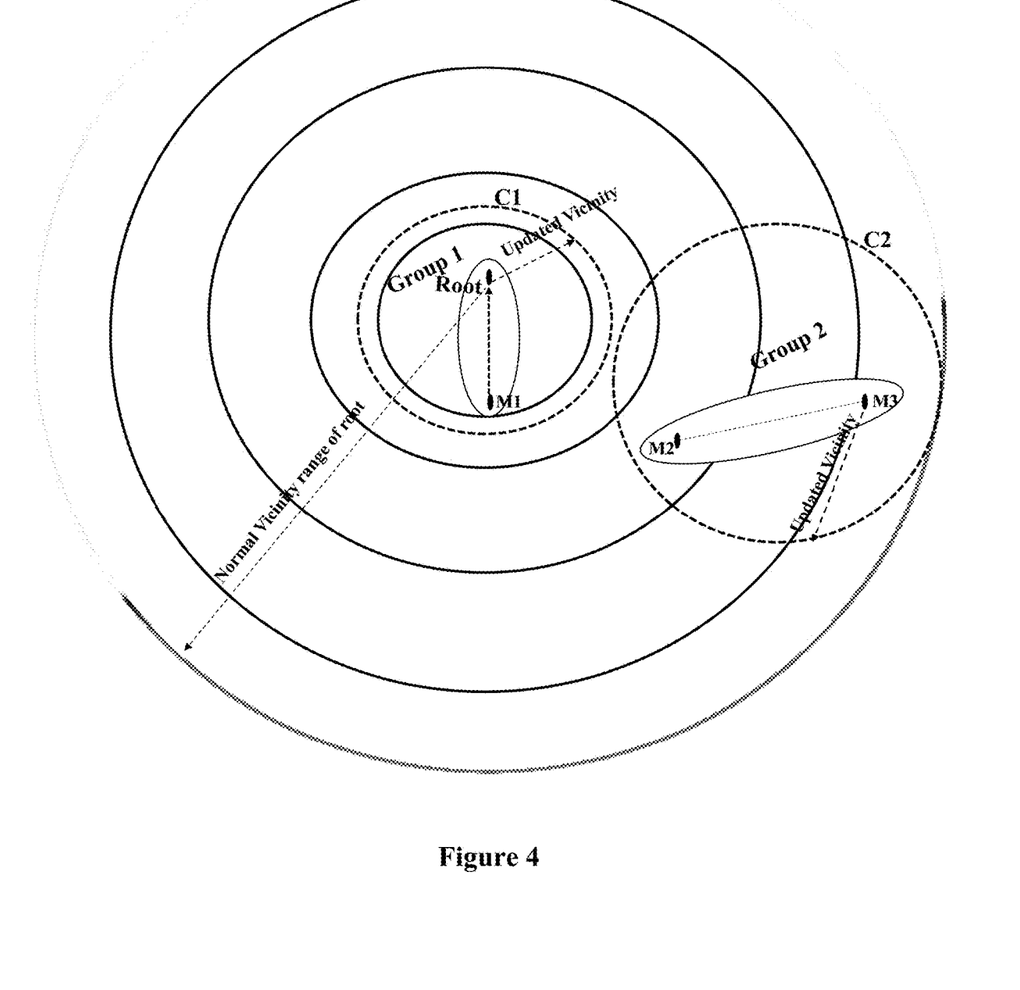
FIG. 4 illustrates an exemplary embodiment of transaction associated with the client devices with non-weak link, in accordance with an embodiment of the present subject matter.

Referring now to FIG. 4, transaction associated with the client devices with non-weak link, is illustrated with an embodiment of the present subject matter.

In an exemplary embodiment, referring to FIG. 4, there may exist 4 mesh devices in the network such as a root node, mesh node M1, mesh node M2 and mesh node M3. At some instance, transaction between the root node and M1 may takes place at the same time of the transaction between M2 and M3. In this case, a transmit power of the mesh nodes may be configured. Based on configuring the transmit power, the mesh nodes may fail to hear other transactions happening at the same time. This may enable better channel usage due to simultaneous data transaction that is performed.

Exemplary embodiments discussed above may provide certain advantages. Though not required to practice aspects of the disclosure, these advantages may include those provided by the following features.

Exemplary embodiments discussed above may provide certain advantages. Though not required to practice aspects of the disclosure, these advantages may include for steering client devices with non-weak link in a network. Although implementations for methods and system for steering client devices with non-weak link in the network have been described in language specific to structural features and/or methods, it is to be understood that the appended claims are not necessarily limited to the specific features or methods described. Rather, the specific features and methods are disclosed as examples of implementations for steering client devices with non-weak link.

The invention claimed is:

1. A method, comprising:
    identifying, by a network balancer, a subset of nodes from a set of nodes in a communication network, wherein the subset of nodes is having a set of client devices connected to the subset of nodes;
    receiving, by the network balancer, data from a client device in the set of client devices connected to the subset of nodes;
    identifying, by the network balancer, in the subset of nodes, that the client device has a non-weak link; and
    steering, by the network balancer, the client device based on one or more parameters identified in the data from the client device, wherein the steering is performed towards a root node.

2. The method as claimed in claim 1, wherein the communication network comprises a mesh network, wherein the mesh network comprises at least one of the root node, a set of mesh nodes, and the set of client devices in the set of mesh nodes.

3. The method as claimed in claim 1, wherein the data from the client device comprises Received Signal Strength Indicator (RSSI) for the client device, parent node hop for the client device, parent node traffic load for the client device, an average traffic at each node for the client device, and a throughput estimate for the client device, wherein a throughput estimate for parent node for the client device and a throughput estimate for a prospective parent node for the client device are calculated by using each of a radio capability of the client device, radio capability of a node, RSSI report, node noise, node load, RSSI index percentage, and a desired throughput value to be selected for a comparison of the throughput estimate for parent node for the client device with the throughput estimate for the prospective parent node for the client device for evaluating a candidate device to be selected as the client device with the non-weak link for the steering.

4. The method as claimed in claim 1, wherein the one or more parameters comprises at least one of a relative Received Signal Strength Indicator (RSSI) of the client device, relative parent node level in the communication network, relative parent node traffic load with potential parent nodes, relative status of parent's radio parameters with other potential parent's parameters, an experience of client devices with parent node and traffic consumption history of the client device.

5. The method as claimed in claim 1, wherein the identifying the subset of nodes comprises:
    comparing an average traffic at each node with a threshold average traffic, wherein the average traffic is computed based on an overall network traffic byte and a number of nodes in the communication network; and
    identifying the subset of nodes based on the comparing.

6. The method as claimed in claim 1, wherein the identifying that the client device has the non-weak link comprises:
    comparing Received Signal Strength Indicator (RSSI) of the client device in the set of client devices with a threshold signal strength;
    checking if the RSSI of the client device is greater than the threshold signal strength; and
    determining that the client device has the non-weak link responsive to the RSSI of the client device being greater than the threshold signal strength,
    wherein the steering the client device comprises moving the client device with the non-weak link from one node to another node in the communication network.

7. The method as claimed in claim 6, wherein the identifying that the client device has the non-weak link further comprises:
    selecting the client device in the set of client devices as a candidate device for the steering according to one or more evaluation parameters, wherein the one or more evaluation parameters comprise at least one of total traffic at all nodes in the communication network, number of nodes, average node traffic, node traffic, station traffic, number of stations, average station traffic, and a predefined time period from timeout station associated with a node.

8. The method as claimed in claim 7, wherein the selecting is performed based on check of one or more conditions, wherein the one or more conditions comprises at least one of a condition when node traffic at each node is greater than average node traffic, a condition when at station node, the station traffic is greater than average station traffic.

9. The method as claimed in claim 7, wherein the selecting comprises:
    evaluating the candidate device based on a comparison of a throughput estimate for parent node for the client device with a throughput estimate for a prospective parent node for the client device,
    wherein the client device is selected for the steering in case the throughput estimate for the prospective parent node is greater than the throughput estimate for the parent node, and
    wherein each of the throughput estimate for parent node for the client device and the throughput estimate for the prospective parent node for the client device is calculated by using each of a radio capability of the client device, radio capability of a node, Received Signal Strength Indicator (RSSI) report, node noise, node load, RSSI index percentage, and a desired throughput value to be selected for the comparison.

* * * * *